Dec. 16, 1924.
R. W. BOND
1,519,392
SHUTTER FOR CINEMATOGRAPH APPARATUS
Filed Oct. 21, 1922
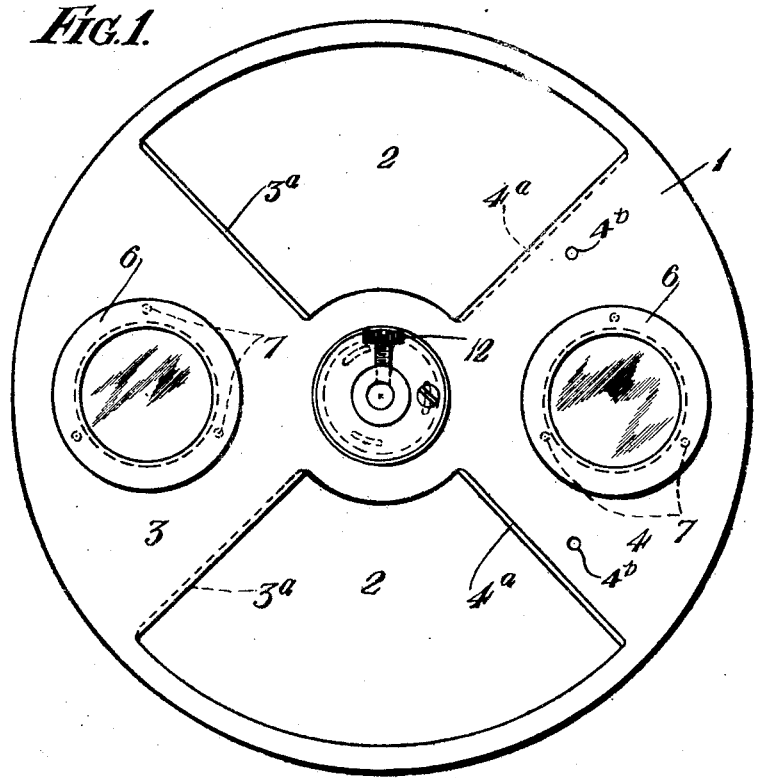
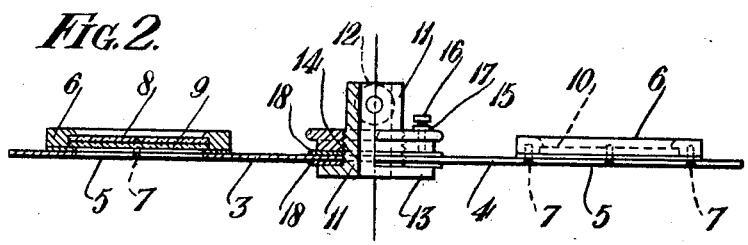

Patented Dec. 16, 1924.

1,519,392

UNITED STATES PATENT OFFICE.

REUBEN WALLACE BOND, OF NEWPORT, WALES.

SHUTTER FOR CINEMATOGRAPH APPARATUS.

Application filed October 21, 1922. Serial No. 596,120.

*To all whom it may concern:*

Be it known that I, REUBEN WALLACE BOND, subject of the King of Great Britain and Ireland, and resident of 70 Corporation Road, Newport, Monmouthshire, South Wales, have invented a certain new and useful Shutter for Cinematograph Apparatus, of which the following is a specification.

My invention relates to an improved shutter for cinematograph apparatus, and has for its object to provide a simple form of shutter which will reduce flicker and eye strain to a minimum, and which also tends to give a relief or stereoscopic effect to the different objects in the picture.

I employ the known type of double-bladed shutter formed from sheet fibre or other suitable material mounted upon an aluminium or other boss adapted to be secured upon the shutter shaft of the projector. One blade of this shutter is adapted to cover the picture during the movement of the film in the gate, whilst the other acts as a balance weight for the first blade and is arranged opposite thereto and has a compensating action which reduces the contrast between the light and dark periods.

According to this invention, I provide circular or other apertures in each blade of the shutter diametrically opposite to each other and in line with the lens axis. These apertures are provided with coloured filters of glass or other suitable material so as to permit coloured rays of light to pass through them to the screen for short periods. One of these apertures has an amber coloured filter whilst the other has amber and green filters. Each filter is mounted over an aperture in the shutter blade and is preferably circular in shape, and is secured in place by a fibre or other suitable ring recessed to receive the filters and secured to the shutter blade by screws, rivets or other suitable means.

The shutter is mounted upon an adjustable boss so that the blades may be correctly set to synchronize with the movement of the machine.

In order that my invention may be readily understood reference is made to the accompanying drawings in which:—

Figure 1 is a front elevation of an improved shutter for cinematograph apparatus constructed according to my invention, and Figure 2 is a part sectional plan of same.

Referring to the drawings, the shutter comprises a fibre or other disc 1 divided into four substantially equal sectors, so as to provide segmental openings 2 and blades 3 and 4. The blade 3 is the actual shutter blade which acts to cut off the picture whilst the film is moving in the gate, and the blade 4 is a balance blade which also cuts off the picture for a period whilst it is stationary. In each of the blades 3 and 4 is provided a circular aperture 5 over which is secured a recessed fibre ring 6 secured thereto by screws 7. In the fibre ring 6 on the shutter blade 3 are mounted two filters 8 and 9 of respectively amber and green coloured glass or other suitable transparent material. In the ring 6 on the balance blade 4 is provided a single filter 10 of amber coloured glass or other suitable transparent material. The two filters 8 and 9 cover the aperture 5 in the shutter blade 3 and permit a small amount of coloured light to pass to the screen, whilst the film is being moved, but sufficiently obscure to prevent the actual movements of the film from being visible to the eye. The other coloured filter 10 in the balance blade 4 permits a considerable volume of amber coloured light to pass to the film whilst it is stationary thus producing a coloured image of the picture upon the screen. The two openings 2 in the shutter will of course permit the picture to be projected upon the screen in the ordinary manner and the resultant effect will be that a picture is produced on the screen in which flicker is greatly minimized with a corresponding reduction in eye strain to the viewer.

The edges of the shutter blades 3 and 4 are chamfered in opposite directions as shown at 3ª and 4ª respectively and the balance blade 4 is also provided with small apertures 4ᵇ to permit the passage of a small quantity of light. These small apertures 4ᵇ are provided at the same distance from the centre of the shutter as the centre of the filter 10 and upon each side of the filter.

The shutter disc 1 is adjustably mounted upon a boss 11 adapted to be clamped upon the shutter shaft by means of the clamping screw 12. This boss 11 is provided with a flange 13 at one end and is screw threaded at 14 for the reception of a knurled nut 15 which may be tightened upon the screw thread 14 so as to clamp the shutter between it and the flange 13 on the boss 11.

A set screw 16 is screwed into the nut 15 so that it may be tightened against the shutter to lock this in position when correctly adjusted and a lock nut 17 may be provided on this set screw to retain it in the correct position. This enables the shutter to be set correctly so as to synchronize with the picture movements so enabling the shutter blade 3 to correctly cover the picture during the period that the film is being moved. Thin washers 18 of metal are arranged on each side of the shutter to reinforce the same when made of fibre or the like.

I claim:—

1. A shutter for cinematograph apparatus comprising a disc divided into two symmetrical diametrically opposite opaque portions and two symmetrical diametrically opposite light openings, one of such opaque portions being adapted to cut off the projected light whilst the film is passing through the gate of the apparatus, and the other opaque portion being adapted to momentarily cut off the projected image whilst the film is stationary, an aperture provided in the latter opaque portion being filled with an amber coloured filter, and the other opaque portion being provided with an aperture filled with two superimposed filters, one being amber coloured and the other green.

2. In a shutter for cinematograph apparatus, a shutter blade and a balance blade oppositely disposed to one another, an amber and a green colour filter disposed over an aperture in the shutter blade, an amber filter disposed over an aperture in the balance blade, recessed fibre rings secured to the shutter and balance blades for mounting the colour filters over the apertures therein.

REUBEN WALLACE BOND.